(12) United States Patent
Lewis

(10) Patent No.: US 7,237,064 B2
(45) Date of Patent: Jun. 26, 2007

(54) METHOD AND APPARATUS FOR FEEDBACK-BASED MANAGEMENT OF COMBINED HEAP AND COMPILED CODE CACHES

(75) Inventor: Brian T. Lewis, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 10/684,012

(22) Filed: Oct. 10, 2003

(65) Prior Publication Data
US 2005/0102657 A1 May 12, 2005

(51) Int. Cl.
*G06F 12/00* (2006.01)
*G06F 9/45* (2006.01)

(52) U.S. Cl. .................... 711/118; 71/125; 71/130; 71/170

(58) Field of Classification Search ............... 711/100, 711/117, 118, 125, 140, 154, 170; 707/206; 717/140
See application file for complete search history.

(56) References Cited

U.S. PATENT DOCUMENTS

| | | | |
|---|---|---|---|
| 5,651,136 A * | 7/1997 | Denton et al. ............. 711/118 |
| 6,263,302 B1 * | 7/2001 | Hellestrand et al. ........ 703/17 |
| 6,295,594 B1 * | 9/2001 | Meier ..................... 711/171 |
| 6,442,661 B1 * | 8/2002 | Dreszer ................... 711/170 |
| 6,957,237 B1 * | 10/2005 | Traversat et al. .......... 707/206 |
| 7,103,723 B2 | 9/2006 | Cierniak | |
| 2003/0200392 A1 * | 10/2003 | Wright et al. ............. 711/118 |

OTHER PUBLICATIONS

Brian Lewis, et al., "The Open Runtime Platform: A Flexible High-Performance Managed Runtime Environment," Intel Technology Journal, vol. 7, Issue 1, pp. 5-18, Feb. 19, 2003.
Bala, et al., "Dynamo: A Transparent Dynamic Optimization System", PLDI 2000, Vancouver, Canada, 2000.
Bill Venners, Free Online Chapters of "Inside the Java Virtual Machine", Chapters 5 and 9, available at http://www.artima.com/insidejvm/ed2/.

* cited by examiner

*Primary Examiner*—Tuan V. Thai
(74) *Attorney, Agent, or Firm*—Trop, Pruner & Hu, P.C.

(57) ABSTRACT

Disclosed are a method, apparatus and system for managing a shared heap and compiled code cache in a managed runtime environment. Based on feedback generated during runtime, a runtime storage manager dynamically allocates storage space, from a shared storage region, between a compiled code cache and a heap. For at least one embodiment, the size of the shared storage region may be increased if a growth need is identified for both the compiled code cache and the heap during a single iteration of runtime storage manager processing.

38 Claims, 13 Drawing Sheets

METHOD AND APPARATUS FOR FEEDBACK-BASED MANAGEMENT OF COMBINED HEAP AND COMPILED CODE CACHES

BACKGROUND

1. Technical Field

The present disclosure relates generally to information processing systems and, more specifically, to managing a shared memory region for a heap and a compiled code cache in managed runtime environments.

2. Background Art

Platform-independent high-level programming languages such as Java and C# have gained significant market presence, especially for network-based applications. Typically, programs written in these languages execute in a managed runtime environment (MRTE) that provides automatic memory management, type management, threads and synchronization, and dynamic loading facilities.

The automatic memory management provided by an MRTE typically includes management of a heap and management of a compiled code cache. A heap is an area of memory reserved for the dynamic memory allocation needs of an application. It is thus reserved for data that is created at runtime, usually because the size, quantity, or lifetime of an object to be allocated could not be determined at compile time. For devices with a small memory footprint, such as mobile devices including cellular telephones and personal digital assistants, management of this relatively limited memory area in order to maximize available storage capacity is a key objective.

Regarding the MRTE's management of a compiled code cache, it should be understood that MRTEs typically support just-in-time compilation. Programs written in high-level programming languages such as Java and C# typically are first compiled to codes in a platform-neutral distribution format called bytecode. The compiled bytecode typically is not directly run on a platform.

While an MRTE may directly interpret bytecodes, this is not typically done unless memory is exceedingly limited. MRTE interpretation of bytecodes may significantly reduce performance. Instead, an MRTE typically includes a just-in-time compiler that translates, on demand, an application's bytecode instructions into native instructions for the processor on which the MRTE is executing. The native instructions are stored in a compiled code cache.

Because native code is typically several times larger than its bytecode counterpart, MRTEs for limited memory devices carefully manage the code cache to provide as much storage capacity as possible during execution of the application program.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for managing a shared heap and compiled code cache in a managed runtime environment.

DETAILED DESCRIPTION

Described herein are selected embodiments of an apparatus and methods for managing a combined heap and compiled code cache in a managed runtime environment. In the following description, numerous specific details such as types of virtual machines, programming languages, specific compilers, and order of control flow for operations of a method have been set forth to provide a more thorough understanding of the present invention. One skilled in the art will appreciate, however, that the invention may be practiced without such specific details. Additionally, some well-known structures, circuits, and the like have not been shown in detail to avoid unnecessarily obscuring the present invention.

Figure 1:
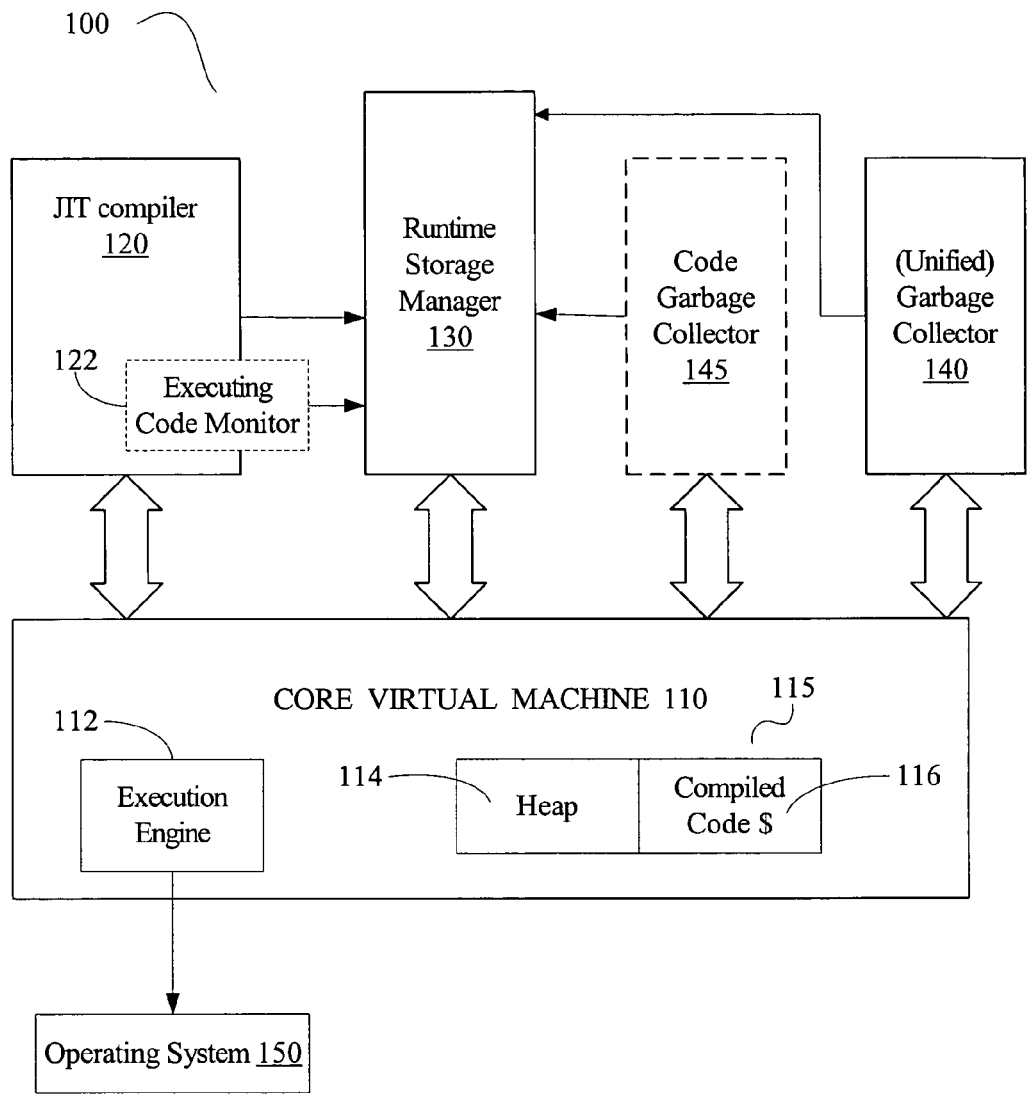
FIG. 1 is block diagram illustrating at least one embodiment of a managed runtime environment capable of dynamically performing feedback-based management of a combined heap and compiled code cache.

FIG. 1 depicts an example managed runtime environment ("MRTE") 100 capable of dynamically performing feedback-based management of a shared storage region 115 that includes both a heap 114 and compiled code cache 116. Each MRTE 100 runs on a processor with its own instruction set and an operating system, such as operating system 150. The MRTE 100 dynamically loads and executes code that is delivered to it in the portable bytecode format. This means that the MRTE 100 converts the bytecodes into native instructions through interpretation or compilation.

The MRTE 100 includes a core virtual machine ("VM") 110 capable of interpreting bytecodes into instructions understood by the processor on which the MRTE 100 is running. For at least one embodiment of a virtual machine for Java programs, the core VM 110 is a Java Virtual Machine (JVM). For at least on other embodiment, the core VM 110 is a Common Language Infrastructure (CLI) For C# programs.

FIG. 1 illustrates that the core VM 110 includes an execution engine 112. The execution engine 112 may directly interpret the bytecodes to execute them.

FIG. 1 illustrates that the core VM 110 also includes one or more automatically-managed runtime memory areas. For at least one embodiment, the automatically managed runtime memory areas include a heap 114 and a compiled code cache 116. Although not shown, one of skill in the art will recognize that the VM 110 may include additional runtime memory areas including program counter registers, stacks, and the like.

FIG. 1 illustrates that MRTE 100 also includes a just-in-time (JIT) compiler 120. Instead of using the relatively slower interpretation provided by the execution engine 112, the MRTE 100 may execute native code generated by the JIT compiler 120. The first time a method is invoked, the JIT compiler 120 compiles the bytecode of the given method into a native code of the processor on which the MRTE 100 is executing. The native code of the method is stored in a compiled code cache 116 in memory. The execution engine 112 may execute later calls to the method by re-using this stored native code, if the native code of the method has not been evicted from the compiled code cache 116.

Accordingly, executing an application via compiled native code stored in a compiled code cache 116 is much faster than executing the same code through JVM-interpreted instructions. This is because interpretation of bytecodes by a virtual machine usually imposes a performance penalty for the execution of a bytecode because of the large runtime overhead processing required. That is, the extra layer of the interpreter between the application and the operating system 150 utilizes a significant amount of the platform's execution resources.

Accordingly, MRTE 100 includes the Just-In-Time (JIT) compiler 120 to improve the core VM's 110 performance. However, a native code occupies memory space in the compiled code cache 116. In many systems that have a large compiled code cache 116, storing native codes in a code cache 116 is not problematic and it overcomes the run-time overhead associated with VM interpretation.

FIG. 1 illustrates that the MRTE 100 further includes a runtime storage manager 130 and a garbage collector 140. If the garbage collector 140 is implemented as a unified garbage collector, it performs both object and code garbage collection. If, however, garbage collector 140 only performs object garbage collection to manage the heap 114, then MRTE 100 may also include a code garbage collector 145. Garbage collection for both the heap 114 and the compiled code cache 116 are discussed in further detail below.

For devices with a small memory footprint, particularly mobile devices, all native codes generated by a JIT compiler 120 during execution of a particular application may be too big to fit in the memory. For systems with a small code cache 116, the space in the compiled code cache 116 is limited and efficient use of such a small code cache 116 is therefore desirable.

To use a JIT compiler for small memory devices it may therefore be desirable to employ memory management mechanisms to efficiently manage use of memory space allocated for storage of native codes. For at least one embodiment, the garbage collector 140 may be utilized to recycle the space occupied by dead methods in the compiled code cache 116.

While the term "garbage collection" is typically used to refer to managing the heap 114, we use herein the term "code garbage collection" to refer to management of the compiled code cache 116. For at least one embodiment, the MRTE 100 utilizes a combined garbage collector 140 to provide garbage collection functions for both the heap 114 (referred to here in as "object garbage collection") and for the compiled code cache 116 (referred to herein as "code garbage collection"). For at least one other embodiment, the garbage collector 140 is utilized to manage only the heap 114. For such embodiment, a separate code garbage collector 145 is utilized to manage the compiled code cache 116. The optional nature of the placement of the code garbage collection functionality is indicated in FIG. 1 via the use of broken lines for the code garbage collector 145. One of skill in the art will recognize, of course, that the code garbage collector 145 may be included within any other component of the MRTE 110, rather than being a stand-alone module. For instance, for at least one embodiment the function of the code garbage collector 145 is part of the JIT compiler's 120 functionality.

For code garbage collection, a native code may be discarded from the compiled code cache 116 when it is determined that that native code is no longer needed. In some systems, a native code may be discarded if the compiled code cache 116 becomes full. This latter approach is simple to implement, but it may be expensive in terms of run-time overhead because it necessitates a flurry of recompilations after each flush of the compiled code cache 116. That is, even currently-executing methods are flushed and immediately re-compiled.

Accordingly, the MRTE 100 illustrated in FIG. 1 includes an executing code monitor 122. The executing code monitor 122 helps the MRTE component responsible for code garbage collection (140, 145 or the JIT 120) to decide which method's native code to discard from the compiled code cache 116. For at least one embodiment, the executing code monitor 122 tracks and maintains information concerning the execution of methods during run-time. For at least one embodiment, for example, the executing code monitor 122 records which methods have been executed recently and how often the methods are executed. This information may then be utilized during code garbage collection to help determine which native codes to discard by predicting those methods that are likely to be executed again in the near future.

The tracking of method information by the executing code monitor 122 may be implemented in any of several manners. For at least one embodiment, the executing code monitor 122 uses program counter (PC) sampling to periodically detect which method is being executed. For at least one other embodiment, the executing code monitor 122 depends on instructions that cause a method to increment a counter each time the method is entered. For such embodiment, each method is associated with a dedicated counter; the counter is reset upon eviction of the method's native code from the compiled code cache 116.

For at least one other embodiment, the executing code monitor 122 utilizes hardware profiling to keep track of which methods are being executed. Also, at least one other embodiment of the executing code monitor 122 may utilize a stack-based counter method such that a counter for a method is incremented each time the method is compiled by a JIT compiler such as compiler 120. The method's counter is incremented or decremented depending on whether the native code for the compiled method appears on a thread stack during garbage collection. For further information regarding this type of approach, please see co-pending U.S. patent application Ser. No. 10/374,909, entitled "Priority-Based Code Cache Management."

FIG. 1 illustrates that the JIT compiler 120 may include an executing code monitor 122. For at least one alternative embodiment, however, the executing code monitor may be implemented as a separate functional module 122. Whether or not the executing code monitor 122 is logically grouped within the JIT compiler 120 or is a stand-alone module, the functionality described herein is maintained. Accordingly, the optional inclusion of the functionality of the executing code monitor 122 within the compiler 120 is denoted by broken lines and offset placement in FIG. 1.

The VM 110 thus accepts a platform-independent Java bytecode and then either interprets the bytecode into instructions understandable by the underlying processor or compiles the bytecode, using a JIT compiler 120, into a native code that is stored in a code compiled code cache 116.

FIG. 1 illustrates that the core VM 110 includes an automatically-managed shared storage region 115. The shared storage region 115 includes the compiled code cache 116 discussed above, and also includes a heap 114. As with the compiled code cache 116, an MRTE's heap 114 typically occupies a significant portion of the MRTE's total memory footprint. The heap 114 should be large enough to hold an application's working set of objects. Otherwise, undesirable consequences may occur. For instance, the program may fail due to insufficient heap memory to store the necessary "live" objects. Insufficient heap size may also lead to the inefficiencies that result when the MRTE 100 spends more time performing garbage collection than executing the application.

In order to free up space in the heap, the garbage collector 140 automatically performs object garbage collection for the heap. Object garbage collection is performed, for instance, when the heap 116 becomes full or when the remaining available storage in the heap 116 falls below some predetermined threshold.

Although FIG. 1 illustrates a unified garbage collector 140 that may perform code garbage collection for the compiled code cache 116 as well as object garbage collection for the heap 114, one skilled in the art will recognize that, as is discussed above, object and code garbage collection may be split out into two or more separate functional modules.

FIG. 1 illustrates that the MRTE 100 includes a runtime storage manager 130 to dynamically adjust the allocation of the shared storage area 115 between the heap 114 and the compiled code cache 116. As is shown in FIG. 1, the heap 114 and the compiled code cache 116 occupy a single storage region 115. At least one embodiment of the runtime storage manager 130 may utilize feedback from the garbage collector 140, the executing code monitor 122, the JIT compiler 120 and/or, if the code garbage collector 145 is a stand-alone module, from the code garbage collector 145 to control how the memory of the shared storage area 115 is allocated between the heap 114 and the compiled code cache 116.

Figure 2:
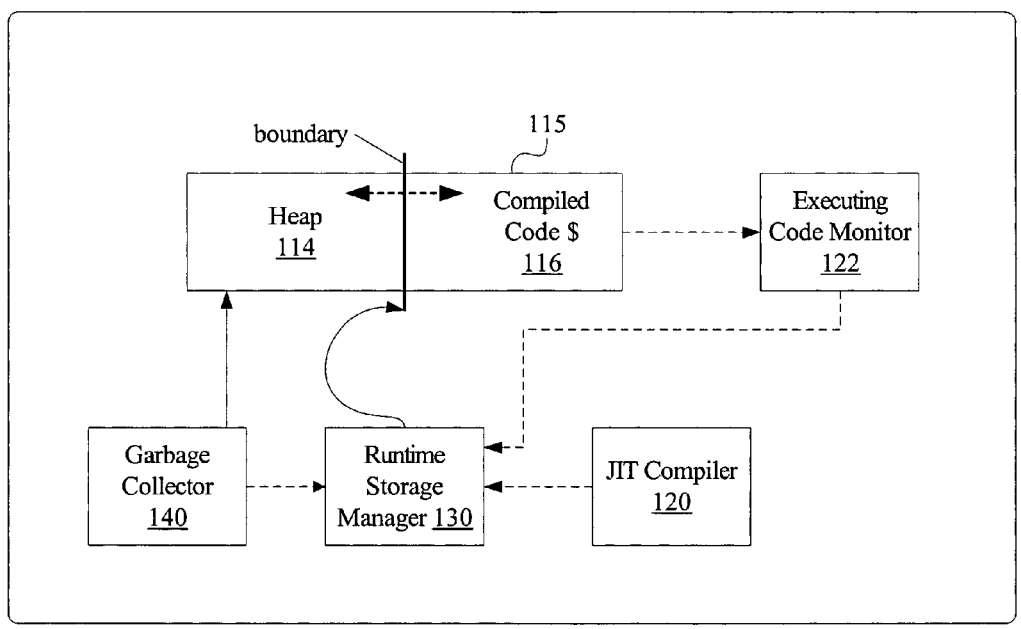
FIG. 2 is a data flow diagram illustrating data flow among components of at least one embodiment of a managed runtime environment that provides automatic feedback-based management of a combined heap and compiled code cache.
Figure 3:
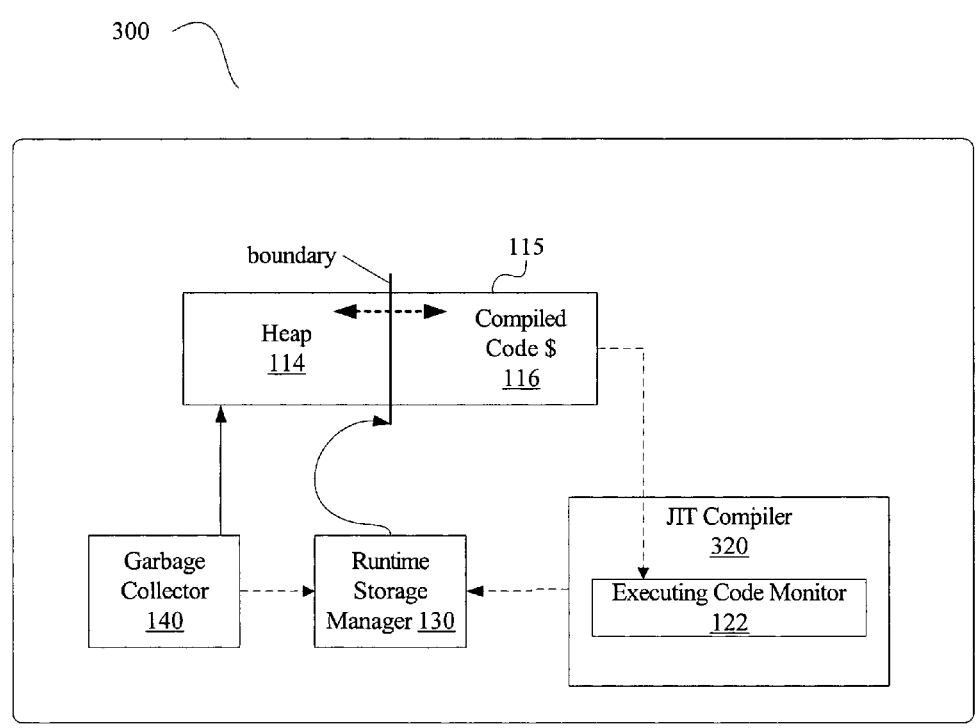
FIG. 3 is a data flow diagram illustrating data flow among components of at least one other embodiment of a managed runtime environment that provides automatic feedback-based management of a combined heap and compiled code cache.

FIGS. 2 and 3 illustrate that, generally, the runtime storage manager 130 modifies the allocation of the shared storage region 115 in order to dynamically control the boundary between the heap 114 and the compiled code cache 116. FIG. 2 illustrates that the runtime storage manager 130 performs such function for an MRTE 200 that has a standalone executing code monitor 122. FIG. 3 illustrates an embodiment of an MRTE 300 in which the runtime storage manager 130 receives information from an executing code monitor 122 that is implemented as part of the functionality of a JIT compiler 320.

The runtime storage manager 130 modifies allocation of the shared storage region 115. The runtime storage manager 130 allows an area (i.e., the heap 114 or the compiled code cache 116) to grow if it appears to have an increasing working set, and allows the area to shrink if its working set appears to be smaller. The runtime storage manager 130 allocates more of the shared storage region's 115 memory to the heap 114 if the rate of object garbage collection is increasing or if the percentage of live objects remaining in the heap 114 after garbage collection is increasing. In such case, assuming that the shared storage region 115 is of a fixed size, the size of the compiled code cache 116 is accordingly decreased.

Similarly, the runtime storage manager 130 allocates more of the shared storage region's 115 memory to the compiled code cache 116 if the rate of JIT compilations is increasing or if, based on feedback from the executing code monitor 130, it appears that the total storage for the compiled code of the recently executed methods is increasing. In such case, assuming that the shared storage region 115 is of a fixed size, the size of the heap 114 is accordingly decreased.

If both the heap 114 and the compiled code cache 116 need to grow, the runtime storage manager may take one of several actions. If permitted, the size of the shared storage region 115 may be increased. If such size increase is not permitted, then the runtime storage manager 130 may increase the area with the greatest need to grow. If both areas need to grow with same degree of urgency, the runtime storage manager 130 may be unable to accommodate either area and may, instead, do nothing.

At least one embodiment of the runtime storage manager 130 may modify the allocation of the shared storage region 115 to decrease the size of the heap 114 or the compiled code cache 116. A more detailed discussion of the operation of the runtime storage manager 130 is set forth below in connection with the discussion of FIGS. 4–7.

Figure 4:
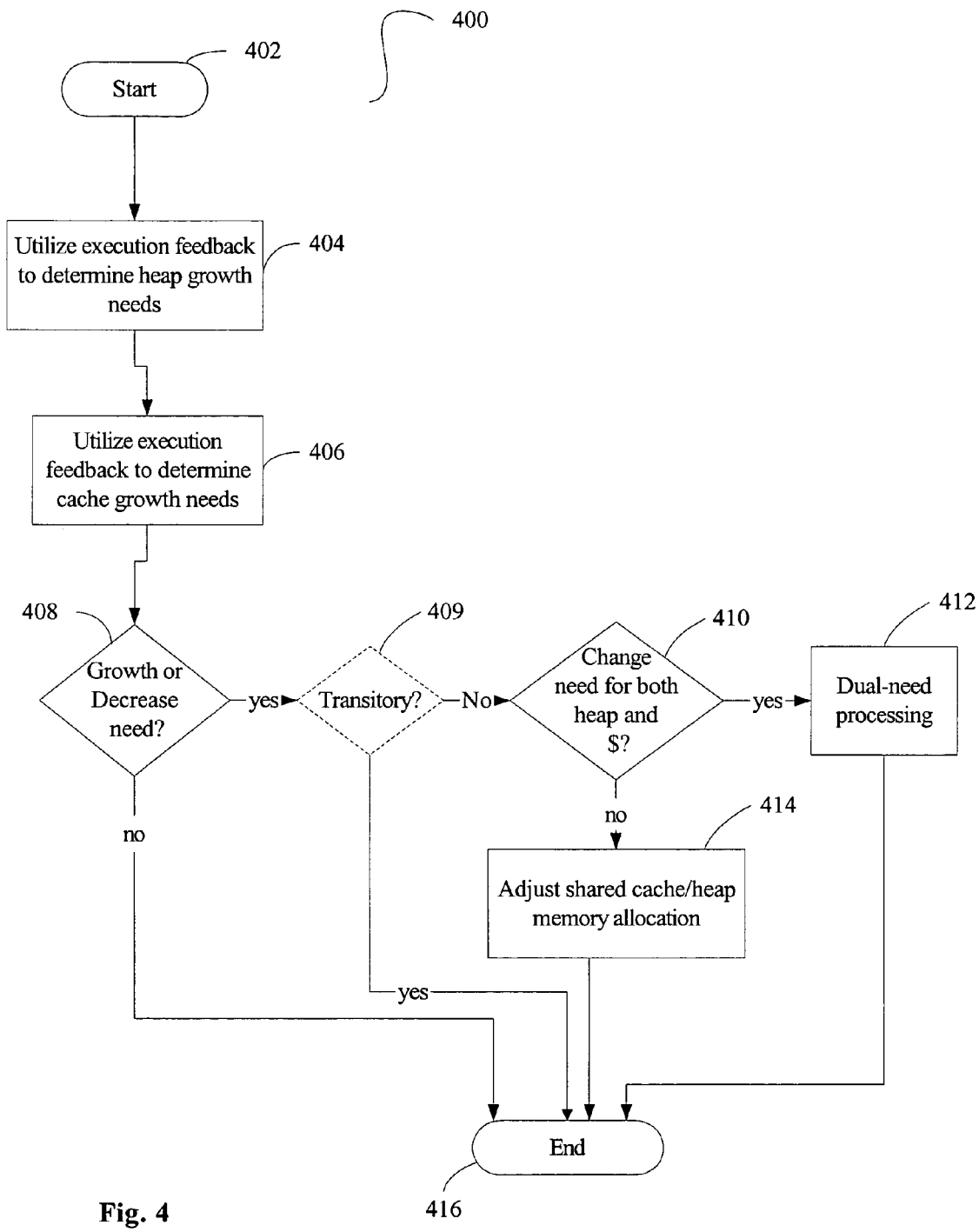
FIG. 4 is a flowchart illustrating a method of performing feedback-based management of a combined heap and compiled code cache.

FIG. 4 is a flowchart illustrating a method of dynamically modifying a shared storage region to allocate memory between a heap (such as, for example, heap 114 of FIG. 1) and a compiled code cache (such as, for example, compiled code cache 116 of FIG. 1). For at least one embodiment, the method 400 is performed by a runtime storage manager, such as runtime storage manager 130 illustrated in FIGS. 1–3.

FIG. 4 illustrates, generally, that the method 400 utilizes feedback generated during execution of an application program. Processing for the method 400 begins at block 402 and proceeds to block 404. At block 404 a first set of feedback is utilized to determine growth needs for the heap 114 (FIG. 1). That is, at block 404 it is determined whether the size of the heap should be increased or decreased. Processing then proceeds to block 406, where a second set of feedback is utilized to determine growth needs for the compiled code cache 406. At block 406 it is determined whether the size of the compiled code cache should be increased or decreased.

Processing then proceeds to block 408. At block 408 it is determined whether, based on the determinations made at blocks 404 and 406, the shared storage region 115 (FIG. 1) should be modified to adjust the allocation of its memory in order to increase an area (114 or 116, FIG. 1) of the shared storage region 115 (FIG. 1) that needs to grow. In addition, it may be determined at block 408 whether the shared storage region 115 (FIG. 1) should be modified to adjust the allocation of its memory in order to decrease an area (114 or 116, FIG. 1) of the shared storage region 115 (FIG. 1) that is not currently utilizing all of its memory space. If no growth or decrease is identified, then processing ends at block 416.

If, however, it is determined at block 408 that the heap 114, the compiled code cache 116, or both need to be increased, then processing of the method 400 proceeds to block 410. Similarly, processing proceeds to block 410 if it is determined at block 408 that the size of the heap 114, the compiled code cache 116, or both may be decreased.

At block 410 it is determined whether both the heap 114 and the compiled code cache 116 have been determined to need size modification. If so, processing proceeds to block 412 in order to perform modification based on needs of both the heap 114 and the compiled code cache 116. Processing then ends at block 416.

If, however, only one of the areas 114, 116 needs size modification, then processing proceeds to block 414. At block 414, the allocation of the shared storage region's 115 memory is adjusted. Processing then ends at block 416.

FIG. 4, in conjunction with FIG. 1, illustrates that, at block 414, allocation of the shared storage region 115 is modified at block 414 to adjust the size of the heap 114 and the compiled code cache 116. For example, if the heap 114 exhibits a growth need but the compiled code cache 116 does not (or it has been determined at block 408 that the compiled code cache 116 may be decreased), then more of the shared storage region's 115 memory is allocated to the heap 114 to enlarge the size of the heap 114. The size of the compiled code cache 116 is, of course, decreased by a corresponding amount of memory.

Similarly, if the compiled code cache 116 exhibits a growth need but the heap 114 does not (or it has been determined at block 408 that the heap 114 may be decreased), then more of the shared storage region's 115 memory is allocated to the compiled code cache 116 to enlarge the size of the compiled code cache 116. The size of the heap 114 is decreased by a corresponding amount of memory.

For at least one embodiment, the size of the shared storage region 115 is decreased at block 414 if it has been determined at block 408 that both the compiled code cache 116 and the heap 114 may be decreased.

FIG. 4 illustrates that at least one embodiment of the method 400 includes optional processing 409. Optional processing 409 is designed to facilitate delay of modification to the shared storage region's 115 memory allocation in the case of transient growth needs. At block 409, it is determined whether a growth need has been apparent for at least a predetermined time interval. If not, then processing ends at block 416. Otherwise, processing proceeds to block 410 and continues as described above.

Figure 10:
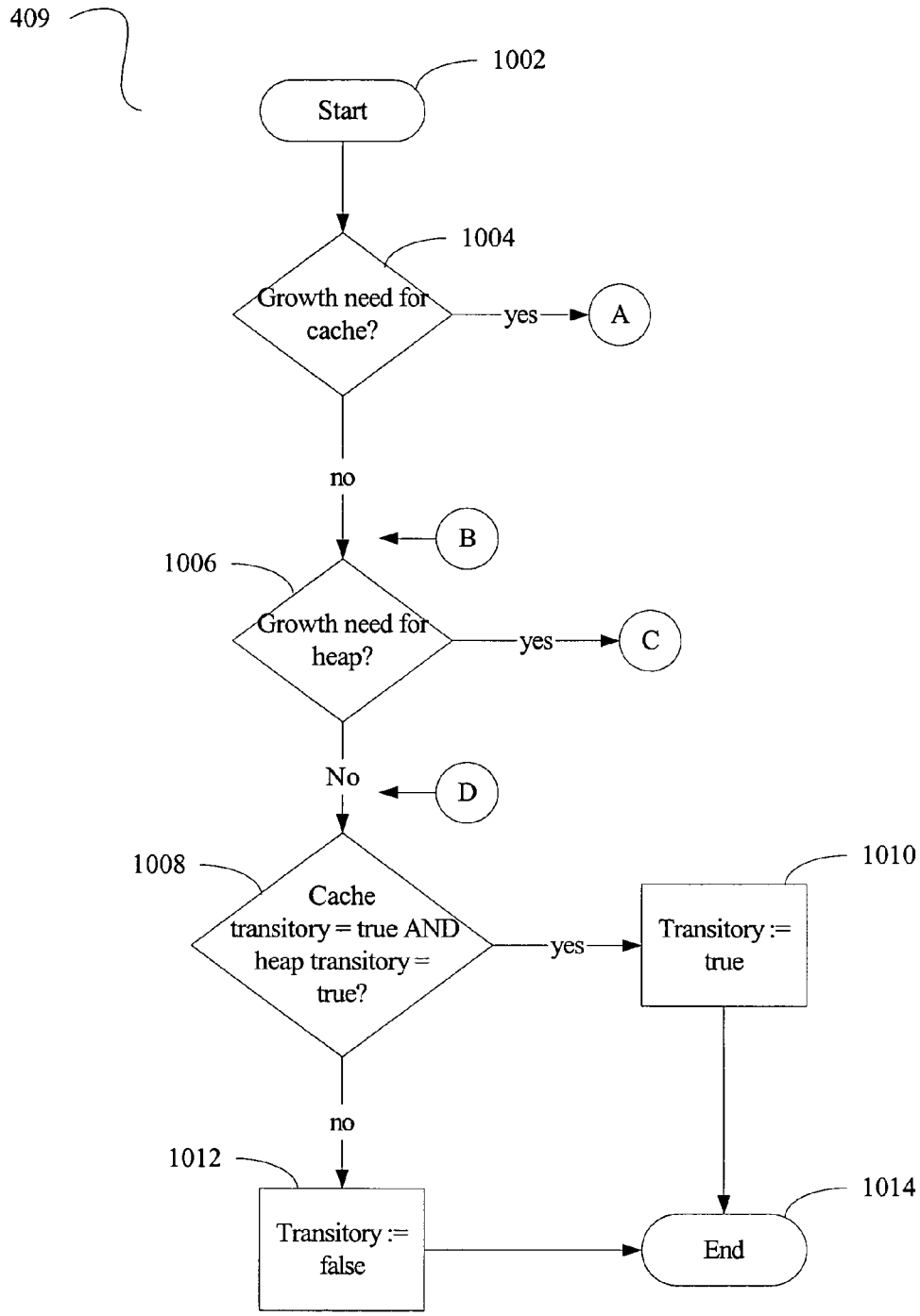
FIGS. 10–12 are flowcharts illustrating at least one embodiment of a method for determining whether growth needs for a shared storage region are transitory.
Figure 11:
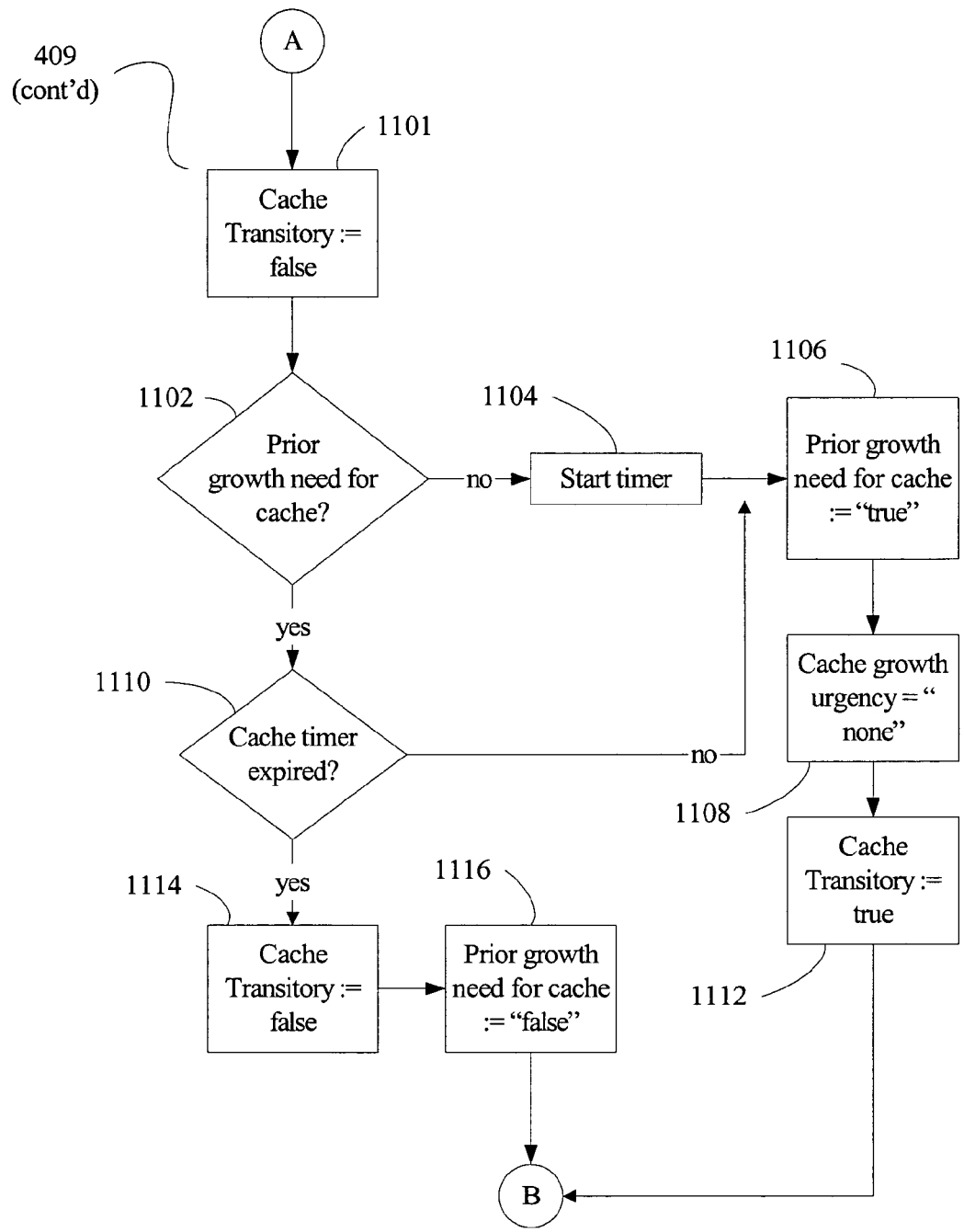
Figure 12:
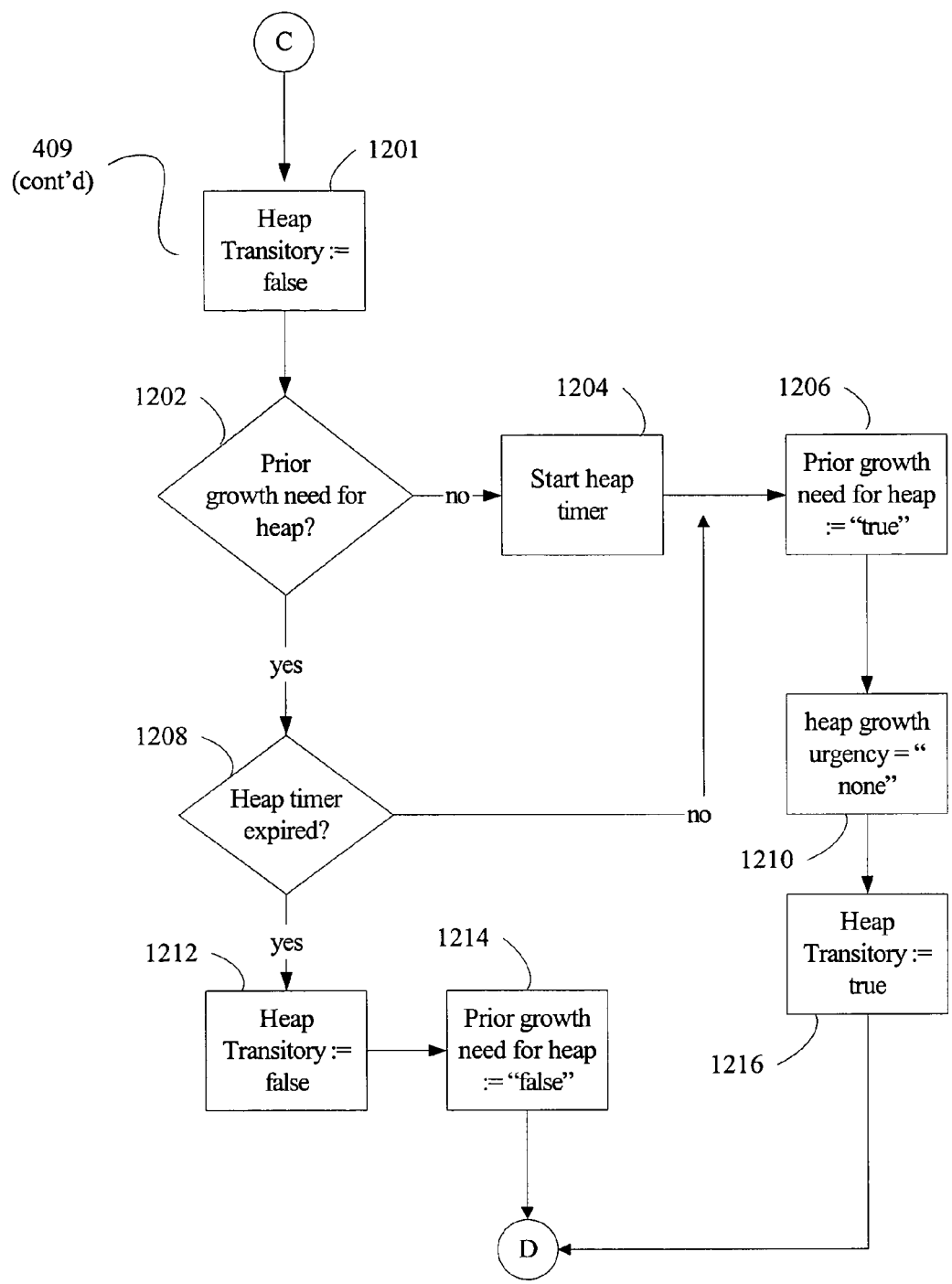

Brief reference to FIGS. 10–12 illustrates further detail for at least one embodiment of block 409, wherein timers are maintained to help determine whether a growth need is transitory. FIG. 10 illustrates that processing for at least one embodiment of the method 409 begins at block 1002 and proceeds to block 1004. Block 1004 evaluates to "true" if it has been determined at block 404 (FIG. 4) that the code cache growth urgency reflects either a "medium" or "high" value. If not, processing proceeds to block 1006.

If code cache growth urgency reflects either a "medium" or "high" value, processing proceeds to A in FIG. 11. Generally, FIG. 11 illustrates that a timer is maintained to determine whether a growth need for the compiled code cache 116 (FIG. 1) has existed for at least a predetermined time interval.

More specifically, FIG. 11 illustrates that processing proceeds from A to block 1101. At block 1101 an indicator is initialized to a "false" value to indicate that the growth need for the compiled code cache 116 (FIG. 1) is not transitory. (If warranted, the value of the transitory indicator for the compiled code cache may later be modified at block 1112, as is discussed below).

Processing proceeds from block 1101 to block 1102. At block 1102 it is determined whether a growth need for the compiled code cache existed during a prior iteration of the processing illustrated in FIG. 11. If so, then the transition from "none" to either "medium" or "high" for the compiled code cache is not new. In other words, a growth need for the compiled code cache has existed prior to execution of the current iteration of the logic illustrated in FIG. 11. Accordingly, control proceeds to block 1110 to determine whether the growth need for the compiled code cache has existed for at least a predetermined length of time.

At block 1110, a timer is evaluated. If the timer reflects that the growth need for the compiled code cache has existed for at least a predetermined time interval, then block 1110 evaluates to a "true" value; otherwise, block 1110 evaluates to a "false" value. In this manner, it is determined at block 1110 whether the growth need for the compiled code cache is transitory. If the growth need has existed for at least the predetermined time interval, then the growth need is determined to not be transitory. Accordingly, control proceeds from block 1110 to block 1114.

At block 1114, a transitory indicator for the compiled code cache is set to a value to indicate that the current growth need for the compiled code cache 116 (FIG. 1) has been determined to not be transitory. Processing then proceeds to block 1116. At block 1116, the prior growth need for the compiled code cache is set to false, so that the timer will be started anew upon the next low-to-high transition for growth need for the compiled code cache. Processing then proceeds to B.

If it is determined at block 1102 that a growth need for the compiled code cache did not exist during a prior iteration of the processing illustrated in FIG. 11, then the transition from "none" to either "medium" or "high" for the compiled code cache is new. In other words, a growth need for the compiled code cache did not exist prior to execution of the current iteration of the logic illustrated in FIG. 11, and the growth need for the compiled code cache may therefore be transitory. In such case, control proceeds to block 1104.

At block 1104, the cache timer is started. The growth need for the compiled code cache 116 (FIG. 1) will only be deemed to not be transitory if it is determined, on a subsequent iteration of the logic illustrated in FIG. 11, that the growth need was sustained for at least a predetermined time interval. After the cache timer is started at block 1104, processing proceeds to block 1106.

At block 1106, an indicator is assigned a value to indicate that the cache indicated a growth need but has not exhibited the growth need for the predetermined length of time. Processing then proceeds to block 1108, where the growth urgency for the compiled code cache 116 (FIG. 1) is reset to a "none" value. In this manner, the potentially transitory growth need is cleared until it can be determined that the growth need is not transitory. Processing then proceeds to block 1112, where an indicator is set to a value that reflects that, for the moment, the growth need for the compiled code cache 116 is considered to be potentially transitory. Processing then proceeds to B.

Returning to FIG. 10, it is seen control proceeds from B to block 1006 of FIG. 10. It should be noted that, when control proceeds to block 1006 from block 1116 (FIG. 11), the growth need for the compiled code cache is not modified, so that it continues to reflect its original "medium" or "high" value as determined at block 1004. In addition, the cache transitory indicator remains "false", as initialized at block 1101 (FIG. 11).

Processing for the heap begins at block 1006, which evaluates to "true" if it has been determined at block 406 (FIG. 4) that the heap growth urgency reflects either a "medium" or "high" value. If not, processing proceeds to block 1008. Otherwise, processing proceeds to C of FIG. 12. Generally, FIG. 12 illustrates that a timer is maintained to determine whether a growth need for the heap 114 (FIG. 1) has existed for at least a predetermined time interval.

More specifically, FIG. 12 illustrates that processing proceeds from C to block 1201. At block 1201 an indicator is initialized to a "false" value to indicate that the growth need for the heap 114 (FIG. 1) is not transitory. (If warranted, the value of the transitory indicator for the heap may later be modified at block 1216, as is discussed below.).

Processing proceeds from block 1201 to block 1202. At block 1202 it is determined whether a growth need for the heap existed during a prior iteration of the processing illustrated in FIG. 12. If so, then the transition from "none" to either "medium" or "high" for the heap is not new. In other words, a growth need for the heap has existed prior to execution of the current iteration of the logic illustrated in FIG. 12. Accordingly, control proceeds to block 1208 to determine whether the growth need for the heap has existed for at least a predetermined length of time.

At block 1208, a timer is evaluated. If the timer reflects that the growth need for the heap has existed for at least a predetermined time interval, then block 1208 evaluates to a "true" value; otherwise, block 1208 evaluates to a "false" value. In this manner, it is determined at block 1208 whether the growth need for the compiled code cache is transitory. If the growth need has existed for at least the predetermined time interval, then the growth need is determined to not be transitory. Accordingly, control proceeds from block 1208 to block 1212.

At block 1212, a transitory indicator for the heap is set to a value to indicate that the current growth need for the heap 1114 (FIG. 1) has been determined to not be transitory. Processing then proceeds to block 1214. At block 1214, the prior growth need for the heap is set to false, so that the timer will be set anew upon the next low-to-high transition for growth need for the heap. Processing then proceeds to D.

If it is determined at block 1202 that a growth need for the heap did not exist during a prior iteration of the processing illustrated in FIG. 12, then the transition from "none" to either "medium" or "high" for the heap is new. In other words, a growth need for the heap did not exist prior to execution of the current iteration of the logic illustrated in FIG. 12, and the growth need for the heap may therefore be transitory. In such case, control proceeds to block 1204.

At block 1204, the heap timer is started. The growth need for the heap 114 (FIG. 1) will only be deemed to not be transitory if it is determined, on a subsequent iteration of the logic illustrated in FIG. 12, that the growth need was sustained for at least a predetermined time interval. After the heap timer is started at block 1204, processing proceeds to block 1206.

At block 1206, an indicator is assigned a value to indicate that the heap indicated a growth need but has not exhibited it for the predetermined length of time. Processing then proceeds to block 1210, where the growth urgency for the heap 114 (FIG. 1) is reset to a "none" value. In this manner, the potentially transitory growth need is cleared until it can be determined that the growth need is not transitory. Processing then proceeds to block 1216, where an indicator is set to a value that reflects that, for the moment, the growth need for the heap 114 is considered to be potentially transitory. Processing then proceeds to D.

Returning to FIG. 10, it is seen control proceeds from D to block 1008 of FIG. 10. It should be noted that, when control proceeds directly to block 1008 from block 1214 (FIG. 12), the growth need for the heap is not modified, such that it continues to reflect its original "medium" or "high" value as determined at block 1006. In addition, the heap transitory indicator remains "false", as initialized at block 1201 (FIG. 12).

FIG. 10 illustrates that, at block 1008, the values of the heap transitory indicator and the cache transitory indicator are evaluated. If both are true, then processing proceeds to block 1010. Otherwise, processing proceeds to block 1012.

At block 1010, a global transitory indicator is set to a "true" value. This indicator is utilized by the runtime storage manager 130 (FIG. 1) to avoid increasing an area of the shared storage region 115 for transitory growth needs (see optional block 409 in FIG. 4). Processing then ends at block 1014.

At block 1012, the global transitory indicator is reset to a "false" value. Processing then ends at block 1014.

FIGS. 10–12 thus indicate further details of optional processing 409 via which the runtime storage manager 130 (FIG. 1) may delay increasing the memory allocated to an area (i.e., the compiled code cache 116, the heap 114, or both) for a period of time until it becomes clear that the need for the increased memory is not just transient. Such processing helps reduce the effect of phase changes in the program's execution. For example, if the program's execution transitions from one kind of computation (such as, for example, initialization) to another kind of computation (such as, for example, writing results) a large number of JIT compilations may occur. Generally, however, the increased number of JIT compilations does not last for very long, and the resulting code will replace much of the older code. The same is true for object allocation. In such circumstances, re-allocating the memory of the shared storage area 115 may not be desirable. Accordingly, the determination at block 409 provides that too-frequent reorganization of the combined heap and code cache area 115 may be minimized.

Figure 5:
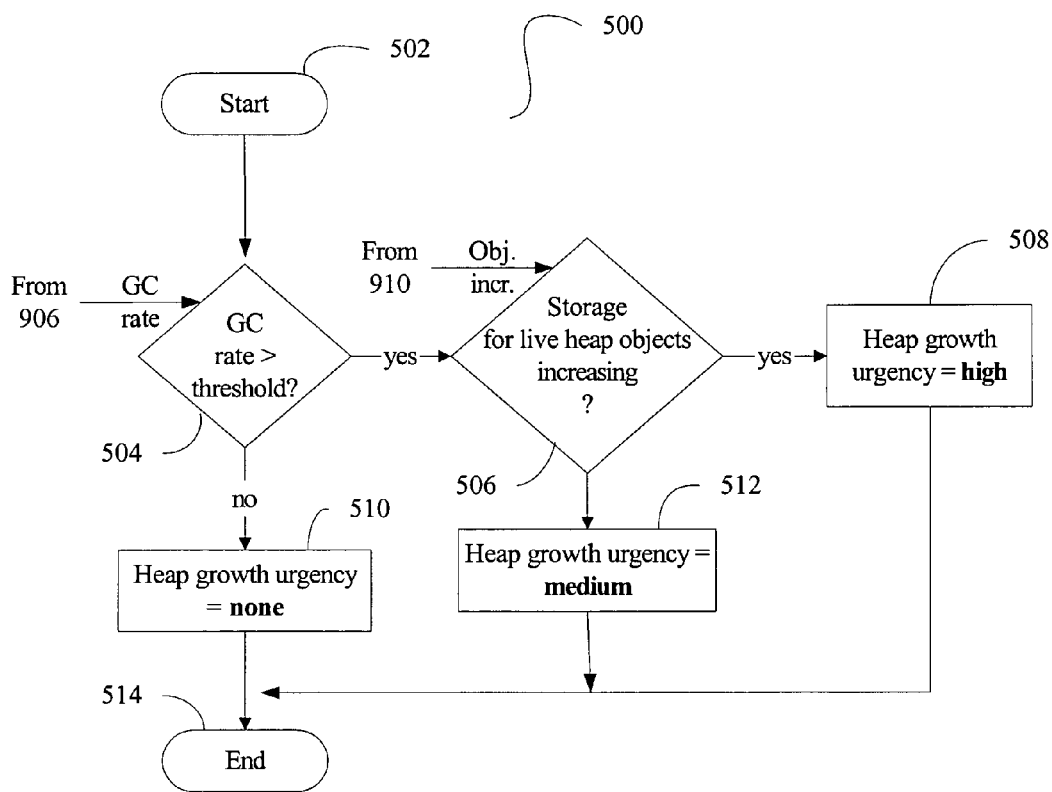
FIG. 5 is as a flowchart illustrating at least one embodiment of a method for determining growth need for a heap.

FIG. 5 illustrates in further detail at least one embodiment of a method 500 for determining heap 114 growth needs at block 404 (FIG. 4). FIG. 5 illustrates that the method of determining 500 heap growth needs begins at block 502 and proceeds to block 504. At block 504, runtime feedback is examined. Specifically, it is determined at block 504 whether the rate of object garbage collection has exceeded a predetermined threshold rate. If so, then the size of the heap 114 should be increased, and processing proceeds to block 506. Otherwise, the size of the heap 114 need not be increased, and processing proceeds to block 510.

At block 510, a heap growth indicator is set with a value, "none", to indicate that increasing the size of the heap 114 is not warranted. Processing then ends at block 514.

However, if the check at block 504 has evaluated to "true", then it is determined at block 506 whether storage for live objects in the heap 114 shows an increasing trend. That is, it is determined 506 whether more storage space in the heap 114 has been allocated for live objects recently. If so, then the size of the heap 114 should be increased.

Accordingly, if both checks 504 and 506 evaluate to "true", then processing proceeds to block 508. As is discussed in further detail below in connection with FIG. 9, the garbage collection rate evaluated at block 504 and the object allocation rate evaluated at block 506 may both reflect dynamic run-time information provided by the object garbage collector 140.

At block 508, the heap growth indicator is set with a value, "high", to indicate that increasing the size of the heap 114 is warranted because the current rate of object garbage collection is relatively high and the amount of space allocated within the heap 114 for live objects is increasing. Processing then ends at block 514.

If it is determined at block 506 that storage for live objects in the heap 114 has not increased recently, then processing proceeds to block 512. At block 512, we know that one parameter (evaluated at block 504) indicating a need to increase the size of the heap 114 is true, but that another parameter (evaluated at block 506) is not true. Accordingly, the heap growth indicator is set at block 512 to a "medium" value to indicate that the increasing the size of the heap 114 is warranted, but that the need has not yet reached an urgent level. Processing then ends at block 514.

Figure 6:
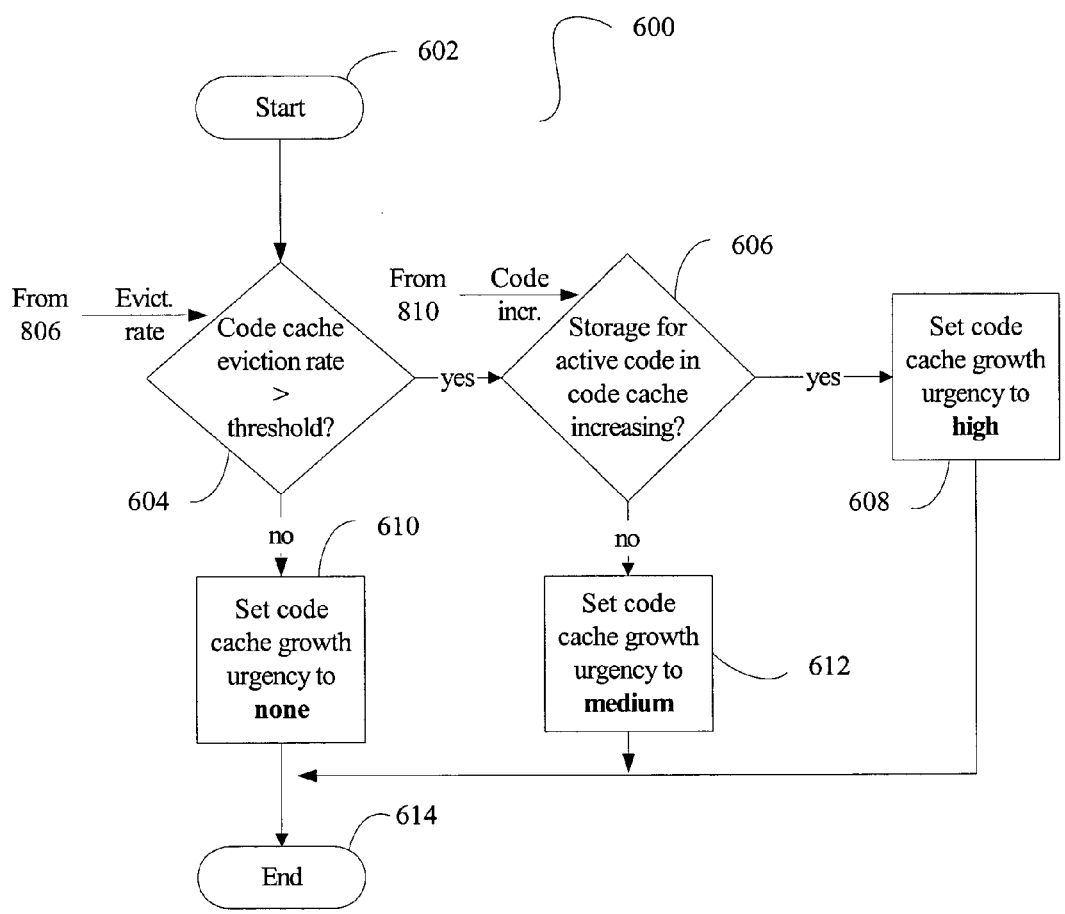
FIG. 6 is as a flowchart illustrating at least one embodiment of a method for determining growth need for a compiled code cache.

FIG. 6 illustrates in further detail at least one embodiment of a method 600 for determining compiled code cache 116 growth needs at block 406 (FIG. 4). FIG. 6 illustrates that the method 600 of determining compiled code cache 116 growth needs begins at block 602 and proceeds to block 604. At block 604, runtime feedback is examined. Specifically, it is determined at block 604 whether the rate of eviction of native codes from the compiled code cache 116 has exceeded a predetermined threshold rate. If so, then the size of the compiled code cache 116 should be increased, and processing proceeds to block 606. Otherwise, the size of the compiled code cache 116 does not need to be increased, and processing proceeds to block 610.

At block 610, a cache growth indicator is set with a value, "none", to indicate that increasing the size of the compiled code cache 116 is not warranted. Processing then ends at block 614.

However, if the check at block 604 has evaluated to "true", then it is determined at block 606 whether storage for active native codes in the compiled code cache 116 shows an increasing trend. That is, it is determined 606 whether more storage space in the compiled code cache 116 has been allocated for active native codes recently. If so, then the size of the compiled code cache 116 should be increased.

Accordingly, if both checks 604 and 606 evaluate to "true", then processing proceeds to block 608. As is discussed in further detail below in connection with FIG. 8, the eviction rate evaluated at block 604 and the allocation rate evaluated at block 606 may both reflect dynamic run-time information provided by the code garbage collector 140 or 145. For an embodiment wherein code garbage collection is performed by the JIT compiler 120, the code cache eviction rate and the code allocation rate may be provided by the JIT compiler 120.

At block 608, the cache growth indicator is set with a value, "high", to indicate that increasing the size of the compiled code cache 116 is warranted because the rate of garbage collection is relatively high and that the amount of space allocated within the compiled code cache 116 for active native codes is increasing. Processing then ends at block 614.

If it is determined at block 606 that storage for active native codes in the compiled code cache 116 has not increased recently, then processing proceeds to block 612. At block 612, it is known that one parameter (evaluated at block 604) indicating a need to increase the size of the heap 114 is true, but that another parameter (evaluated at block 606) is not true. Accordingly, the cache growth indicator is set at block 612 to a "medium" value to indicate that the increasing the size of the compiled code cache 116 is warranted, but that the need has not yet reached an urgent level. Processing then ends at block 614.

Figure 7:
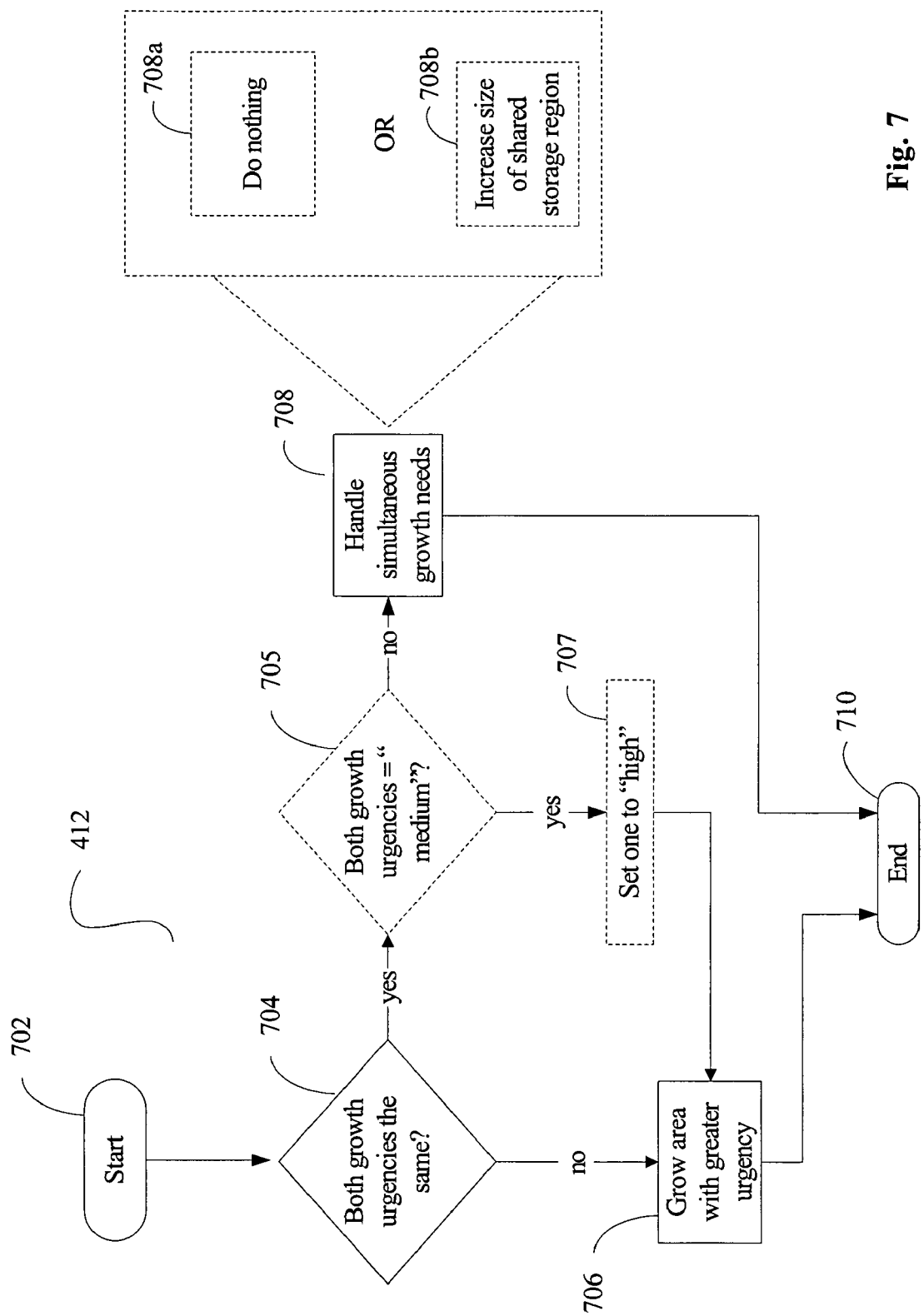
FIG. 7 is a flowchart illustrating at least one embodiment of a method for adjusting memory allocation of a storage region shared by a compiled code cache and a heap when both have growth needs.

FIG. 7 is a flowchart illustrating in further detail at least one embodiment of a method for performing dual-need processing 412 when it has been determined that the size of the heap 114 and the compiled code cache 116 both should be increased. FIG. 7 illustrates that processing for the method 412 begins at block 702 and proceeds to block 704.

At block 704, it is determined whether the growth urgencies for the heap 114 and the compiled code cache 116 are the same. That is, block 704 evaluates according to the truth table illustrated in Table 1:

TABLE 1

| Heap growth indicator | Cache growth indicator | Block 704 evaluation |
| --- | --- | --- |
| Medium | Medium | Yes |
| Medium | Urgent | No |
| Urgent | Medium | No |
| Urgent | Urgent | Yes |

Accordingly, processing proceeds to block 705 if both the heap growth indicator and the cache growth indicator reflect a "medium" value. Processing also proceeds to block 705 if both the heap growth indicator and the cache growth indicator reflect a "high" value.

Otherwise, if the heap growth indicator and the cache growth indicator reflect values that are different from each other, processing proceeds to block 706. At block 706, the area of the shared storage area 115 having the higher growth need value is increased and the other part of the shared storage area 115 is decreased accordingly. Thus, if the cache growth indicator reflects a "medium" value and the heap growth indicator reflects a "high" value, then the size of the heap 114 is increased at block 706 such that more of the memory in the shared storage area 115 is allocated for the heap 114. The size of the compiled code cache 116 is decreased accordingly, in such case, so that the overall size of the shared storage area 115 is not altered.

Similarly, if the cache growth indicator reflects a "high" value and the heap growth indicator reflects a "medium" value, then the size of the compiled code cache 116 is increased at block 706 such that more of the memory in the shared storage area 115 is allocated for the compiled code cache 116. Again, the size of the heap 114 is decreased accordingly, in such case, so that the overall size of the shared storage area 115 is not altered.

If it is determined at block 704 that the heap 114 and compiled code cache 116 growth urgencies are the same, then processing proceeds to block 708. At block 708, the competing growth needs may be handled in any of several manners. For a first embodiment, the runtime storage manager does nothing 708a in the face of competing growth needs. For at least one other embodiment, the size of the shared storage region 115 is increased at block 708b to include n additional memory storage space. For such embodiment, the size of each of the heap 114 and the compiled code cache 116 may be increased by n/2 storage space. Alternatively, for block 708b a heuristic may be employed to allocate the additional n storage space between the heap 114 and the compiled code cache 116. Processing then ends at block 710.

For at least one alternative embodiment, optional processing 705, 707 may be employed for the case illustrated by the first row of Table 1. That is, optional processing 705, 707 (illustrated with broken lines to illustrate the optional nature) may be employed to handle simultaneous growth needs when both the cache growth indicator and the heap growth indicator reflect a "medium" value. In such case, a heuristic is employed at block 705 to select either the heap 114 or the cache 116 for growth. The growth need for the selected area (i.e., either the heap 114 or the compiled code cache 116) is elevated to a "high" level. Processing then proceeds to increase the elevated portion of the shared storage region 115 as described above in connection with block 706.

One of skill in the art will realize, of course, that the optional processing illustrated at blocks 705 and 707 will allow one of the areas to grow, but at the cost of decreasing the size of the other area, which also needs to grow. Accordingly, for at least one embodiment, such processing 705, 707 is not performed and, instead, simultaneous "medium" growth needs are processed at block 708 as described above. Processing then ends at block 710.

Figure 8:
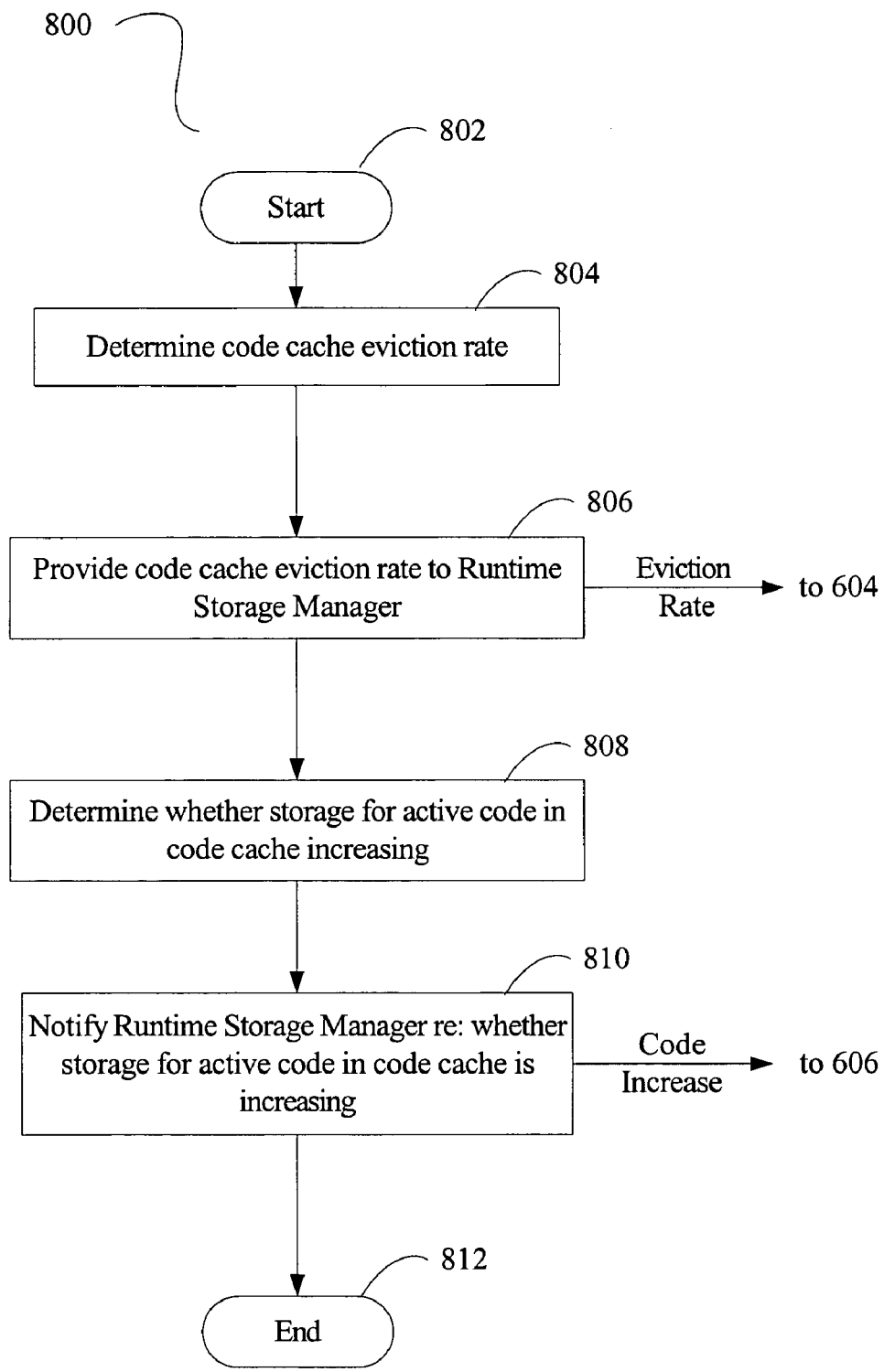
FIG. 8 is a flowchart illustrating at least one embodiment of a method for providing cache feedback, during program execution, to a runtime storage manager.

FIG. 8 illustrates at least one embodiment of a method 800 for providing a first set of feedback during execution of a program. The first set of feedback is, for at least one embodiment, feedback related to the compiled code cache 116. For at least one embodiment, the method 800 is performed by the module 140 or 145 responsible for performing code garbage collection. For at least one other embodiment, the method 800 is performed by the JIT compiler 120.

FIG. 8 illustrates that processing for the method 800 begins at block 802 and continues to block 804. At block 804, the current code cache eviction rate is determined. That is, it is determined how often native codes are being evicted from the compiled code cache 116. For at least one embodiment, this determination 804 is related to the frequency of JIT compilations performed by the JIT compiler 120.

Processing then proceeds to block 806, where the code cache eviction rate is provided to the runtime storage manager 130 (FIG. 1). (For at least one embodiment, the runtime storage manager 130 (FIG. 1) uses the code cache eviction rate to determine whether the compiled code cache 116 needs to grow—see block 604 of FIG. 6). Processing then proceeds to block 808.

At block 808 it is determined whether the amount of space within the compiled code cache 116 being used to store active native codes is increasing. Processing then proceeds to block 810.

At block 810, a code increase feedback indicator is provided to the runtime storage manager 130 (FIG. 1). The code increase feedback indicator reflects the determination made at block 808 concerning whether storage for active native codes in the compiled code cache 116 is increasing. (For at least one embodiment, the runtime storage manager 130 (FIG. 1) uses the code increase feedback to determine whether the compiled code cache 116 needs to grow—see block 606 of FIG. 6). Processing then ends at block 812.

Figure 9:
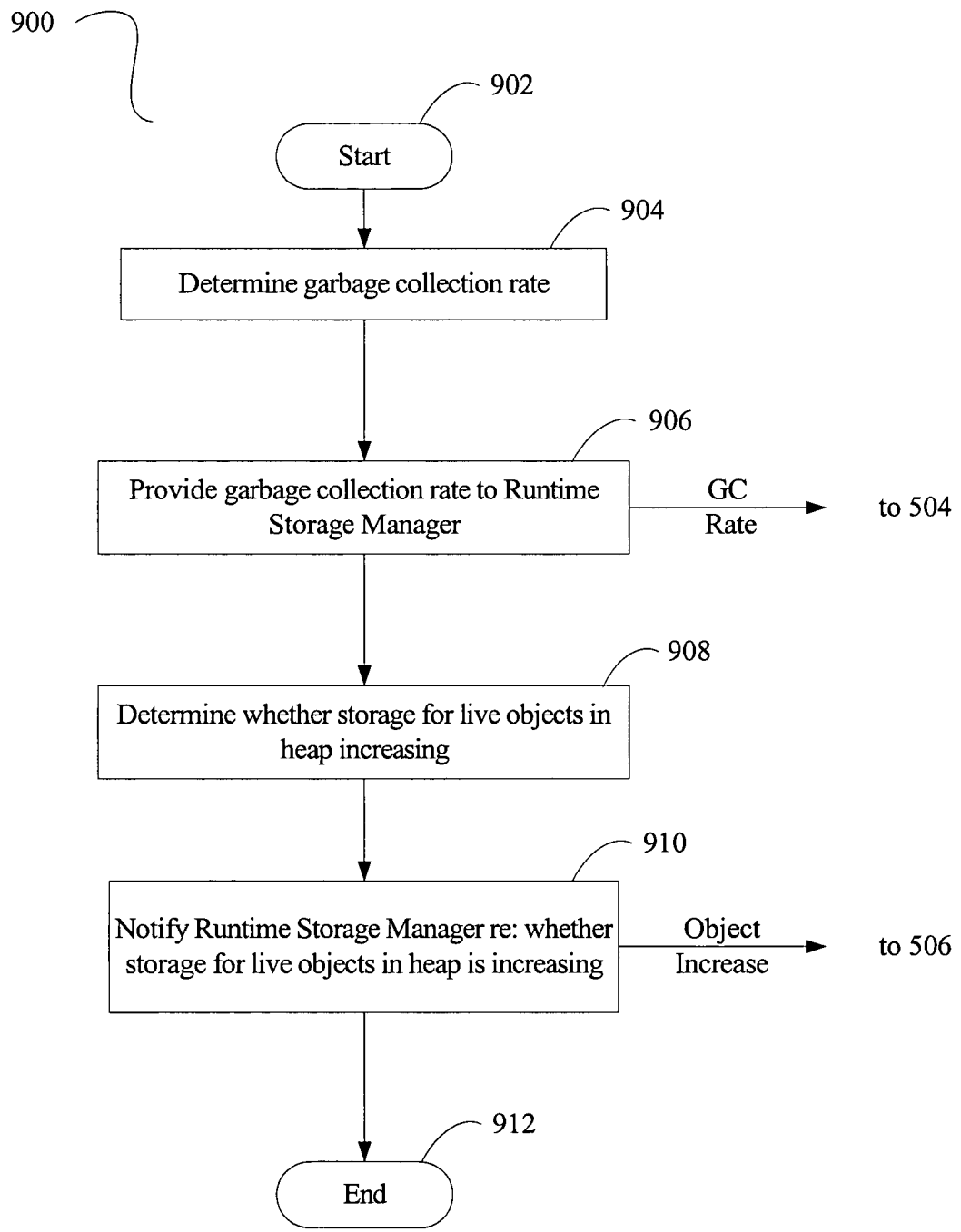
FIG. 9 is a flowchart illustrating at least one embodiment of a method for providing garbage collection feedback, during program execution, to a runtime storage manager.

FIG. 9 illustrates at least one embodiment of a method 900 for providing a second set of feedback during execution of a program. The second set of feedback is, for at least one embodiment, feedback related to the heap 114. For at least one embodiment, the method 900 is performed by object garbage collector 140.

FIG. 9 illustrates that processing for the method 900 begins at block 902 and continues to block 904. At block 904, the current object garbage collection rate is determined. That is, it is determined how often objects are being evicted from the heap 114. Processing then proceeds to block 906, where the object garbage collection rate is provided to the runtime storage manager 130 (FIG. 1). (For at least one embodiment, the runtime storage manager 130 (FIG. 1) uses the object garbage collection rate to determine whether the heap 114 needs to grow—see block 504 of FIG. 5). Processing then proceeds to block 908.

At block 908 it is determined whether the amount of space within the heap 114 being used to store objects is increasing. Processing then proceeds to block 910.

At block 910, an object increase feedback indicator is provided to the runtime storage manager 130 (FIG. 1). The object increase feedback indicator reflects the determination made at block 908 concerning whether storage for active objects in the heap 114 is increasing. (For at least one embodiment, the runtime storage manager 130 (FIG. 1) uses the object increase feedback to determine whether the heap 114 needs to grow—see block 506 of FIG. 5). Processing then ends at block 912.

Embodiments of the methods disclosed herein may be implemented in hardware, software, firmware, or a combination of such implementation approaches. Software embodiments of the methods may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this disclosure, a processing system includes any system that has a processor, such as, for example; a network processor, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the methods described herein are not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the actions described herein. Embodiments of the invention may also be considered to be implemented as a machine-readable storage medium, configured for use with a processing system, where the storage medium so configured causes the processing system to operate in a specific and predefined manner to perform the functions described herein.

Figure 13:
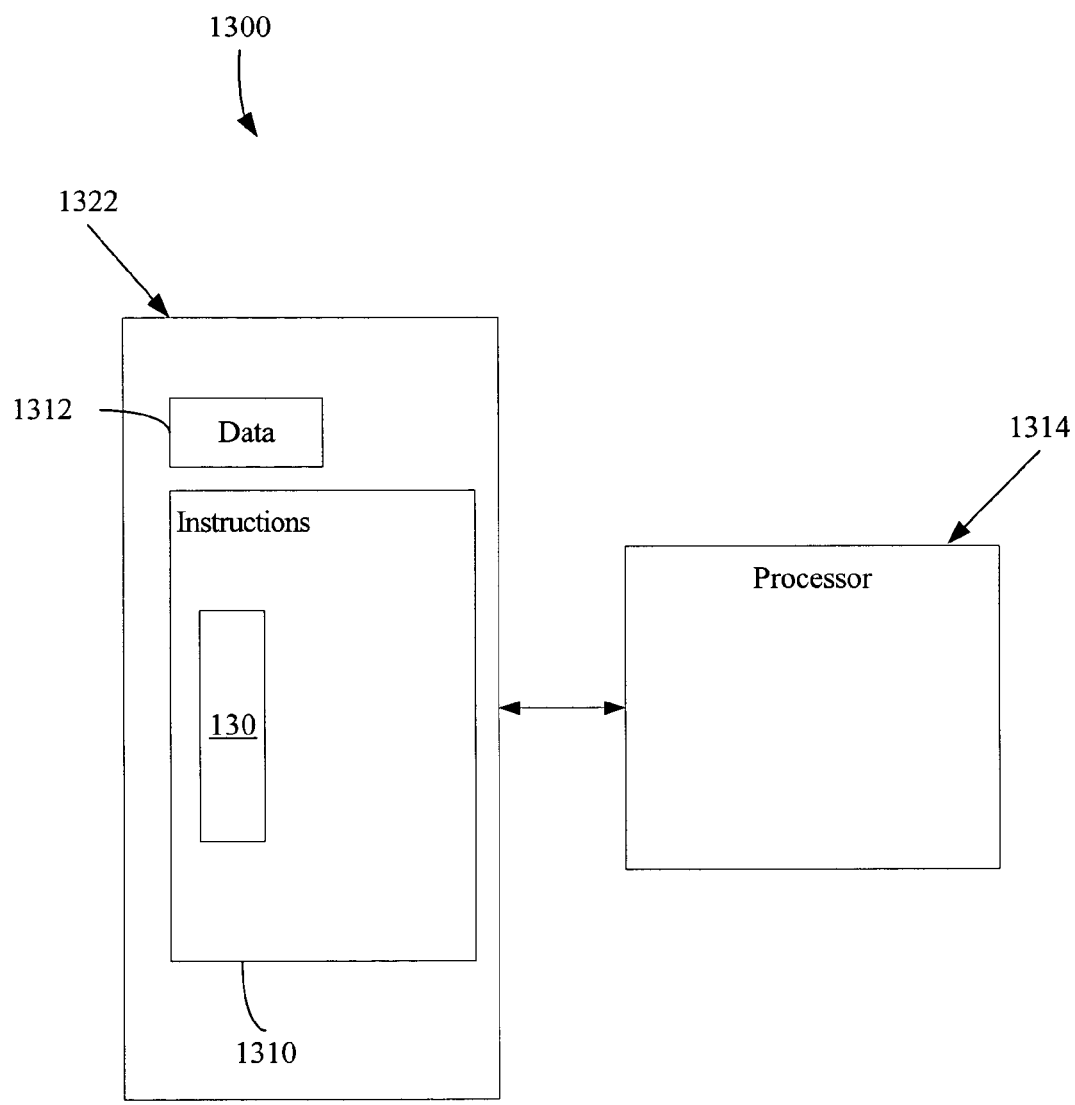
FIG. 13 is a block diagram illustrating at least one embodiment of a processing system capable of utilized disclosed techniques.

An example of one such type of processing system is shown in FIG. 13. System 1300 may be used, for example, to execute the processing for a method of dynamically performing feedback-based management of a combined heap and compiled code cache, such as the embodiments described herein. System 1300 is representative of processing systems, such as cellular telephones, personal digital assistants, portable video players, portable media players and other hand-held devices based on the Intel® XScale™ technology. System 1300 is also representative of processing systems that include the Itanium® and Itanium® 2 microprocessors and the Pentium®, Pentium® Pro, Pentium® II, Pentium® III, Pentium® 4 microprocessors, all of which are available from Intel Corporation. Other systems (including personal computers (PCs) and servers having other microprocessors, engineering workstations, set-top boxes and the like) may also be used. At least one embodiment of system 1300 may execute a version of the Windowsυ operating system available from Microsoft Corporation, although other operating systems and graphical user interfaces, for example, may also be used.

Processing system 1300 includes a memory 1322 and a processor 1314. Memory system 1322 may store instructions 1310 and data 1312 for controlling the operation of the processor 1314. Memory system 1322 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1322 may store instructions 1310 and/or data 1312 represented by data signals that may be executed by the processor 1314.

FIG. 13 illustrates that the instructions implementing embodiments of the methods 400 (FIG. 4), 500 (FIG. 5), 600 (FIG. 6) 412 (FIG. 7), 800 (FIG. 8), 900 (FIG. 9), 409 (FIGS. 10–12) disclosed herein may be logically grouped into various functional modules.

For example, as is stated above, instructions implementing the method 400 illustrated in FIG. 4 may be performed as part of a runtime storage manager 130. Similarly, the methods 500, 600, 412 and 409 illustrated in FIGS. 5, 6, 7 and 10–12, respectively, may also be performed by the runtime storage manager 130.

In the preceding description, various aspects of an apparatus, system and methods for performing dynamic allocation management of a shared heap and compiled code cache are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects.

For example, the methods 400 (FIG. 4), 500 (FIG. 5), 600 (FIG. 6) 412 (FIG. 7), 800 (FIG. 8), 900 (FIG. 9), 409 (FIGS. 10–12) disclosed herein have been illustrated as having a particular control flow. One of skill in the art will recognize that alternative processing order may be employed to achieve the functionality described herein. Similarly, certain operations are shown and described as a single functional block. Such operations may, in practice, be performed as a series of sub-operations.

Also, for example, the shared storage area 115 illustrated in FIG. 1 may include more than two storage areas 114, 116. For such embodiment, the runtime storage manager 130 may also manage storage within the shared storage region 115 for additional storage areas, such as those to store loaded classes or virtual method tables. In such case, the runtime storage manager 130 performs processing similar to that 404, 406 illustrated in FIG. 4 in order to determine, based on run-time feedback, the growth needs for the additional storage areas. Based on such determinations, the runtime manager may modify 414 the shared storage region 115 to allocate more memory to an area that needs to grow. If more than one area needs to grow, an augmented embodiment of block 412 is performed in order to decide how to allocate storage among the multiple areas.

While particular embodiments of the present invention have been shown and described, the appended claims are to encompass within their scope all such changes and modifications that fall within the true scope of the present invention.

What is claimed is:

1. A method comprising:
   making a first determination, based on first feedback generated during execution of a program, the first determination to indicate whether a size of a compiled code cache should be modified;
   making a second determination, based on second feedback generated during execution of the program, the second determination to indicate whether a size of a heap should be modified; and
   modifying a shared storage region based on the first determination and the second determination;
   wherein modifying the shared storage region based on the first and second determinations further comprises if the second determination indicates that the size of the heap should be increased, modifying allocation of the shared storage region to increase the size of the heap, and to decrease the size of the compiled code cache.

2. The method of claim 1, wherein modifying the shared storage region based on the first determination and the second determination further comprises:
   increasing the size of the shared storage region if:
      the first determination indicates that the size of the compiled code cache should be increased; and
      the second determination indicates that the size of the heap should be increased.

3. The method of claim 1, wherein modifying the shared storage region based on the first determination and the second determination further comprises:
   decreasing the size of the shared storage region if:
      the first determination indicates that the size of the compiled code cache should be decreased; and
      the second determination indicates that the size of the heap should be decreased.

4. The method of claim 1, wherein modifying the shared storage region based on the first and second determinations further comprises:
   modifying allocation of the shared storage region to increase the size of the heap if:
      the second determination indicates that the size of the heap should be increased; and
      a growth need for the heap has existed for at least a predetermined time interval.

5. The method of claim 1, wherein modifying the shared storage region based on the first and second determinations further comprises:
   if the first determination indicates that the size of the compiled code cache should be increased, modifying allocation of the shared storage region to increase the size of the compiled code cache.

6. The method of claim 5, wherein modifying the shared storage region based on the first and second determinations further comprises:

if the first determination indicates that the size of the compiled code cache should be increased, modifying allocation of the shared storage region to decrease the size of the heap.

7. The method of claim 1, wherein modifying the shared storage region based on the first and second determinations further comprises:
if the second determination indicates that the size of the heap should be decreased, modifying allocation of the shared storage region to decrease the size of the heap.

8. The method of claim 7, wherein modifying the shared storage region based on the first and second determinations further comprises:
if the second determination indicates that the size of the heap should be decreased, modifying allocation of the shared storage region to increase the size of the compiled code cache.

9. The method of claim 1, wherein modifying the shared storage region based on the first and second determinations further comprises:
modifying allocation of the shared storage region to increase the size of the compiled code cache if:
the first determination indicates that the size of the compiled code cache should be increased; and
a growth need for the compiled code cache has existed for at least a predetermined time interval.

10. The method of claim 1, wherein modifying the shared storage region based on the first and second determinations further comprises:
if the first determination indicates that the size of the compiled code cache should be decreased, modifying allocation of the shared storage region to decrease the size of the compiled code cache.

11. The method of claim 10, wherein modifying the shared storage region based on the first and second determinations further comprises:
if the first determination indicates that the size of the compiled code cache should be decreased, modifying allocation of the shared storage region to increase the size of the heap.

12. The method of claim 1, wherein:
the first feedback includes a code increase indicator to indicate whether the amount of compiled code in the compiled code cache has increased during execution of the program.

13. The method of claim 1, wherein:
the first feedback includes an eviction rate indicator to indicate a rate at which code has been evicted from the compiled code cache during execution of the program.

14. The method of claim 1, wherein:
the first feedback includes a compilation rate indicator to indicate a rate at which code has been compiled by a just-in-time compiler during execution of the program.

15. The method of claim 1, wherein:
the second feedback includes a garbage collection rate indicator to indicate a rate at which unneeded information has been discarded from the heap during execution of the program.

16. The method of claim 1, wherein:
the second feedback includes an object increase indicator to indicate whether live code remaining in the heap after garbage collection has increased during execution of the program.

17. An article comprising:
a machine-readable storage medium having a plurality of machine accessible instructions, which if executed by a machine, cause the machine to perform operations comprising:
making a first determination, based on first feedback generated during execution of a program, the first determination to indicate whether a size of a compiled code cache should be modified;
making a second determination, based on second feedback generated during execution of the program, the second determination to indicate whether a size of a heap should be modified; and
modifying a shared storage region based on the first determination and the second determination;
wherein the instructions that cause the machine to modify a shared storage region based on the first determination and the second determination further comprise instructions that cause the machine to modify allocation of the shared storage region to increase the size of the heap and to decrease the size of the compiled code cache if the second determination indicates that the size of the heap should be increased.

18. The article of claim 17, wherein the instructions that cause the machine to modify a shared storage region based on the first determination and the second determination further comprise instructions that cause the machine to:
increase the size of the shared storage region if:
the first determination indicates that the size of the compiled code cache should be increased; and
the second determination indicates that the size of the heap should be increased.

19. The article of claim 17, wherein the instructions that cause the machine to modify a shared storage region based on the first determination and the second determination further comprise instructions that cause the machine to:
decrease the size of the shared storage region if:
the first determination indicates that the size of the compiled code cache should be decreased; and
the second determination indicates that the size of the heap should be decreased.

20. The article of claim 17, wherein the instructions that cause the machine to modify a shared storage region based on the first determination and the second determination further comprise instructions that cause the machine to:
modify allocation of the shared storage region to increase the size of the heap if:
the second determination indicates that the size of the heap should be increased; and
a growth need for the heap has existed for at least a predetermined time interval.

21. The article of claim 17, wherein the instructions that cause the machine to modify a shared storage region based on the first determination and the second determination further comprise instructions that cause the machine to:
modify, if the first determination indicates that the size of the compiled code cache should be increased, allocation of the shared storage region to increase the size of the compiled code cache.

22. The article of claim 21, wherein the instructions that cause the machine to modify a shared storage region based on the first determination and the second determination further comprise instructions that cause the machine to:
modify, if the first determination indicates that the size of the compiled code cache should be increased, allocation of the shared storage region to decrease the size of the heap.

23. The article of claim 17, wherein the instructions that cause the machine to modify a shared storage region based on the first determination and the second determination further comprise instructions that cause the machine to:
modify, if the second determination indicates that the size of the heap should be decreased, allocation of the shared storage region to decrease the size of the heap.

24. The article of claim 23, wherein the instructions that cause the machine to modify a shared storage region based on the first determination and the second determination further comprise instructions that cause the machine to:
modify, if the second determination indicates that the size of the heap should be decreased, allocation of the shared storage region to increase the size of the compiled code cache.

25. The article of claim 17, wherein the instructions that cause the machine to modify a shared storage region based on the first determination and the second determination further comprise instructions that cause the machine to:
modify allocation of the shared storage region to increase the size of the compiled code cache if:
the first determination indicates that the size of the compiled code cache should be increased; and
a growth need for the compiled code cache has existed for at least a predetermined time interval.

26. The article of claim 17, wherein the instructions that cause the machine to modify a shared storage region based on the first determination and the second determination further comprise instructions that cause the machine to:
modify allocation of the shared storage region to decrease the size of the compiled code cache if the first determination indicates that the size of the compiled code cache should be decreased.

27. The article of claim 26, wherein the instructions that cause the machine to modify a shared storage region based on the first determination and the second determination further comprise instructions that cause the machine to:
modify allocation of the shared storage region to increase the size of the heap if the first determination indicates that the size of the compiled code cache should be decreased.

28. The article of claim 17, wherein:
the first feedback includes a code increase indicator to indicate whether the amount of compiled code in the compiled code cache has increased during execution of the program.

29. The article of claim 17, wherein:
the first feedback includes an eviction rate indicator to indicate a rate at which code has been evicted from the compiled code cache during execution of the program.

30. The article of claim 17, wherein:
the first feedback includes a compilation rate indicator to indicate a rate at which code has been compiled by a just-in-time compiler during execution of the program.

31. The article of claim 17, wherein:
the second feedback includes a garbage collection rate indicator to indicate a rate at which unneeded information has been discarded from the heap during execution of the program.

32. The article of claim 17, wherein:
the second feedback includes an object increase indicator to indicate whether live code remaining in the heap after garbage collection has increased during execution of the program.

33. A method comprising:
making a first determination, based on first feedback generated during execution of a program, the first determination to indicate whether a size of a compiled code cache, which is a memory area to store native code instructions, should be modified;
making a second determination, based on second feedback generated during execution of the program, the second determination to indicate whether a size of a heap, which is a memory area, separate from the compiled code cache, to store data created at runtime but that is not to store code, should be modified; and
based on the first determination and the second determination, modifying a shared storage region, which is to store both the compiled code cache and the heap;
wherein said modifying further comprises moving a boundary between the compiled code cache and the heap while maintaining the current size of the shared storage area, and to decrease the size of the heap.

34. The method of claim 33, wherein:
said modifying further comprises moving the boundary between the compiled code cache and the heap in order to increase the size of the heap.

35. The method of claim 33, wherein:
said modifying further comprises increasing the size of the shared storage region.

36. The method of claim 33, wherein:
said modifying further comprises reducing the size of the shared storage region.

37. The method of claim 33, wherein:
said first feedback includes information regarding usage of the compiled code cache during execution.

38. The method of claim 33, wherein:
said first feedback includes information regarding usage of the heap during execution.

* * * * *